United States Patent
Lee

(10) Patent No.: US 7,550,937 B2
(45) Date of Patent: Jun. 23, 2009

(54) METHOD FOR DETECTING INITIAL MAGNETIC POLE POSITION IN PERMANENT-MAGNET MOTOR

(75) Inventor: Chen-Yeh Lee, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 317 days.

(21) Appl. No.: 11/736,123

(22) Filed: Apr. 17, 2007

(65) Prior Publication Data

US 2008/0258660 A1    Oct. 23, 2008

(51) Int. Cl.
*H02P 21/00* (2006.01)
(52) U.S. Cl. .............. 318/400.02; 318/400.1; 318/400.29
(58) Field of Classification Search .......... 318/721, 318/811, 812, 727, 700, 400.02, 400.1, 400.29
See application file for complete search history.

(56) References Cited

U.S. PATENT DOCUMENTS

2002/0171389 A1 * 11/2002 Nakazawa ................. 318/811

* cited by examiner

*Primary Examiner*—Karen Masih

(57) ABSTRACT

A method for detecting initial magnetic pole position in permanent-magnet motor first determines a PWM pulse width Dt applied to stator, where the PWM pulse width Dt depends on motor parameters. Six voltage vectors are then successively applied to the stators and the associated current rising time are calculated. The position of rotor is determined based on the shortest current rising time. The voltage vectors are again successively applied to the stators to recalculate the position of rotor. The position of rotor can be precisely determined when the two calculations are consistent. When the two calculations are not consistent, the voltage vectors are again successively applied to the stators to recalculate the position of rotor until the calculations are consistent. The set current level can be larger than the motor rated current, for example, 160% motor rated current, to facilitate the determination of current rising time. The set current level can be 160% drive rated current when the motor rated current is larger than the drive rated current.

13 Claims, 6 Drawing Sheets

METHOD FOR DETECTING INITIAL MAGNETIC POLE POSITION IN PERMANENT-MAGNET MOTOR

BACKGROUND OF THE INVENTION

1. Field of the Invention

The present invention relates to a method for detecting initial magnetic pole position in permanent-magnet motor, especially to a method for detecting initial magnetic pole position in permanent-magnet motor by voltage pulse associated with motor parameters.

2. Description of Prior Art

As the progress and automation of industry, servo motors have extensive usage. For example, the CNC machine, robot arm, industrial machine, elevator and air condition generally need precise control for motor. Due to the rapid development of microprocessor and power electronics, the motor can be implemented with complex control theory to enhance the performance thereof.

The permanent magnet AC servo motor employs the pulse width modulation (PCM) signal of inverter to generate a rotational magnetic field for the stator. The rotational magnetic field for the stator is interacted with the permanent magnetic field of the rotator to produce rotational torque. In the control of permanent magnet motor, the switch of the inverter is controlled to generate suitable rotator electrical field for smooth operation of the motor. However, the initial position for the permanent magnet of the rotator is generally unknown. The rotator has both possibilities of forward and backward rotation when the motor starts. However, the uncertain in rotation direction is not desirable in certain application such as elevator. Therefore, the initial magnetic pole position in permanent-magnet motor should be precisely determined to prevent erroneous operation.

The prior art methods for determining the initial magnetic pole position in permanent-magnet motor are high frequency injection (HFI) and voltage pulse injection. The HFI method has the drawbacks of complicated calculation, priori information of d-q axis inductance, no resolution for ±180° electrical angle. The conventional voltage pulse injection method uses the principle that the current ramp slope is different for different inductance when the rotator position is different. However, the conventional voltage pulse injection method has undue dependence to motor parameters. The motor coil has risk of damage when the rising time is not correctly set. The measurement of the initial magnetic pole position is incorrect when the rising time is too low.

It is desirable to provide a fast and precise method for detecting initial magnetic pole position in permanent-magnet motor to enhance the performance and stability of the permanent-magnet motor. The method for detecting initial magnetic pole position in permanent-magnet motor is preferably less dependent on parameter and is compatible to any motor.

SUMMARY OF THE INVENTION

It is the object of the present invention to provide a method for precisely detecting initial magnetic pole position in permanent-magnet motor.

Accordingly, the present invention provides a method for detecting initial magnetic pole position in permanent-magnet motor. A PWM pulse width Dt is first applied to stator, where the PWM pulse width Dt depends on motor parameters. Six voltage vectors are then successively applied to the stators and the associated current rising time are calculated. The position of rotor is determined based on the shortest current rising time.

Accordingly to one aspect of the present invention, the voltage vectors are again successively applied to the stators to recalculate the position of rotor. The position of rotor can be precisely determined when the two calculations are matched. When the two calculations are not matched, the voltage vectors are again successively applied to the stators to recalculate the position of rotor until the calculations are matched.

Accordingly to another aspect of the present invention, in the method of detecting initial magnetic pole position in permanent-magnet motor, the set current level can be larger than the motor rated current, for example, 160% motor rated current, to facilitate the determination of current rising time. The set current level can be 160% drive rated current when the motor rated current is larger than the drive rated current.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1A:
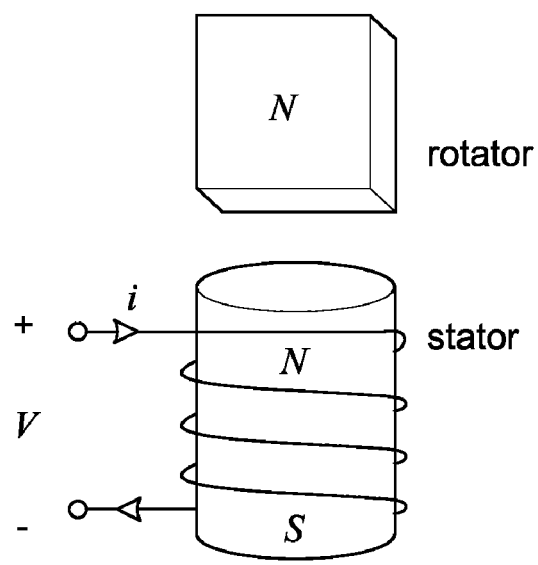
FIGS. 1A and 1B are schematic views for showing the stator magnetic field and rotator magnetic field in permanent-magnet motor.
Figure 1B:
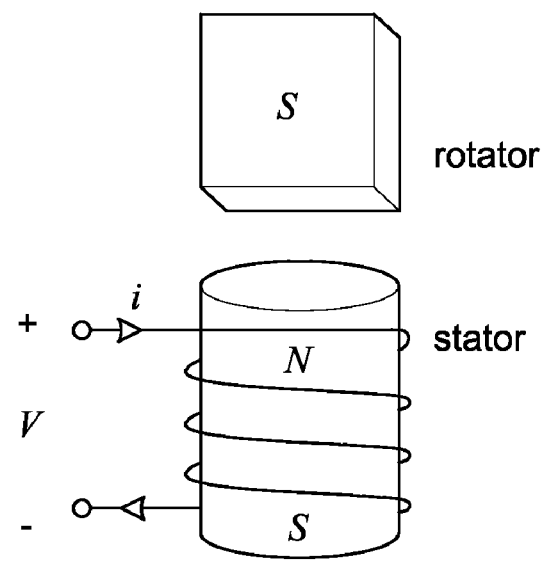

FIGS. 1A and 1B are schematic views for showing the stator magnetic field and rotator magnetic field in permanent-magnet motor, wherein the rotator magnetic field is provided by permanent magnet and the stator magnetic field is provided by external current. Therefore, the stator magnetic field can be treated as known parameter. When the rotator magnetic field and the stator magnetic field have the opposite direction, the composite magnetic field is unsaturated (linear). On the contrary, when the rotator magnetic field and the stator magnetic field have the same, the composite magnetic field is saturated (nonlinear). The saturation degree of the composite magnetic field influences the magnitude of the stator inductance. This property can be exploited for determine the initial magnetic pole position in permanent-magnet motor.

Figure 2:
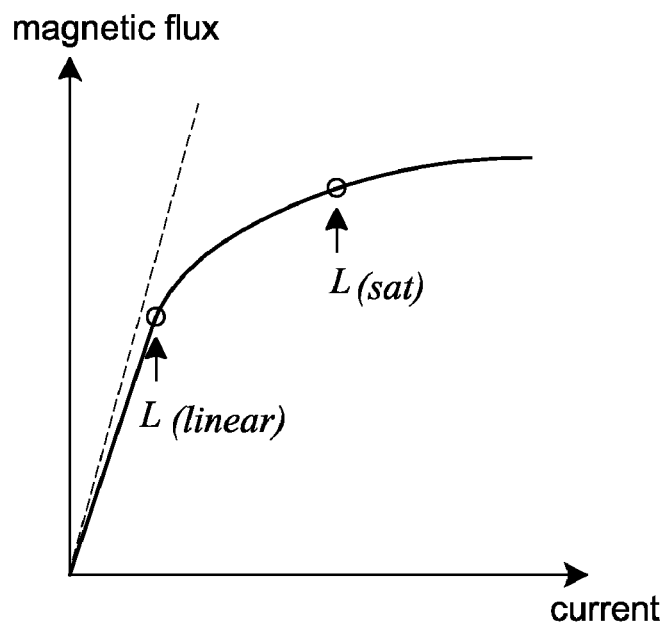
FIG. 2 shows the relationship for the magnetic flux and current in a permanent-magnet motor.

FIG. 2 shows the relationship for the magnetic flux and current in a permanent-magnet motor, where the influence of the saturation degree of the composite magnetic field on the magnitude of the stator inductance can be observed. The inductance is smaller when the composite magnetic field is saturated. On the contrary, the inductance is larger when the composite magnetic field is unsaturated. The time constant for circuit is larger when the stator inductance is larger. As a result, the current ramps slowly for the same applied voltage.

Figure 3:
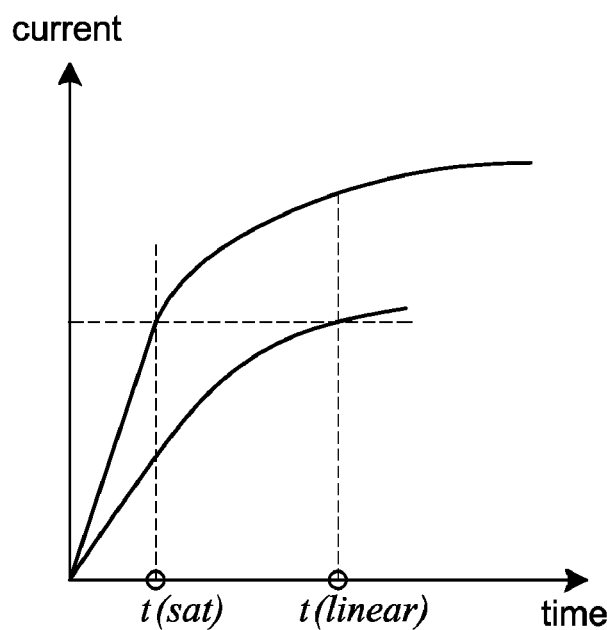
FIG. 3 shows the relationship between the current and the time for different stator inductances.

FIG. 3 shows the relationship between the current and the time for different stator inductances. The stator inductances are different for saturated and non-saturated composite magnetic field. The time for current rising to a level is different for different inductances. This property can be exploited for determine the initial magnetic pole position in permanent-magnet motor.

Figure 4:
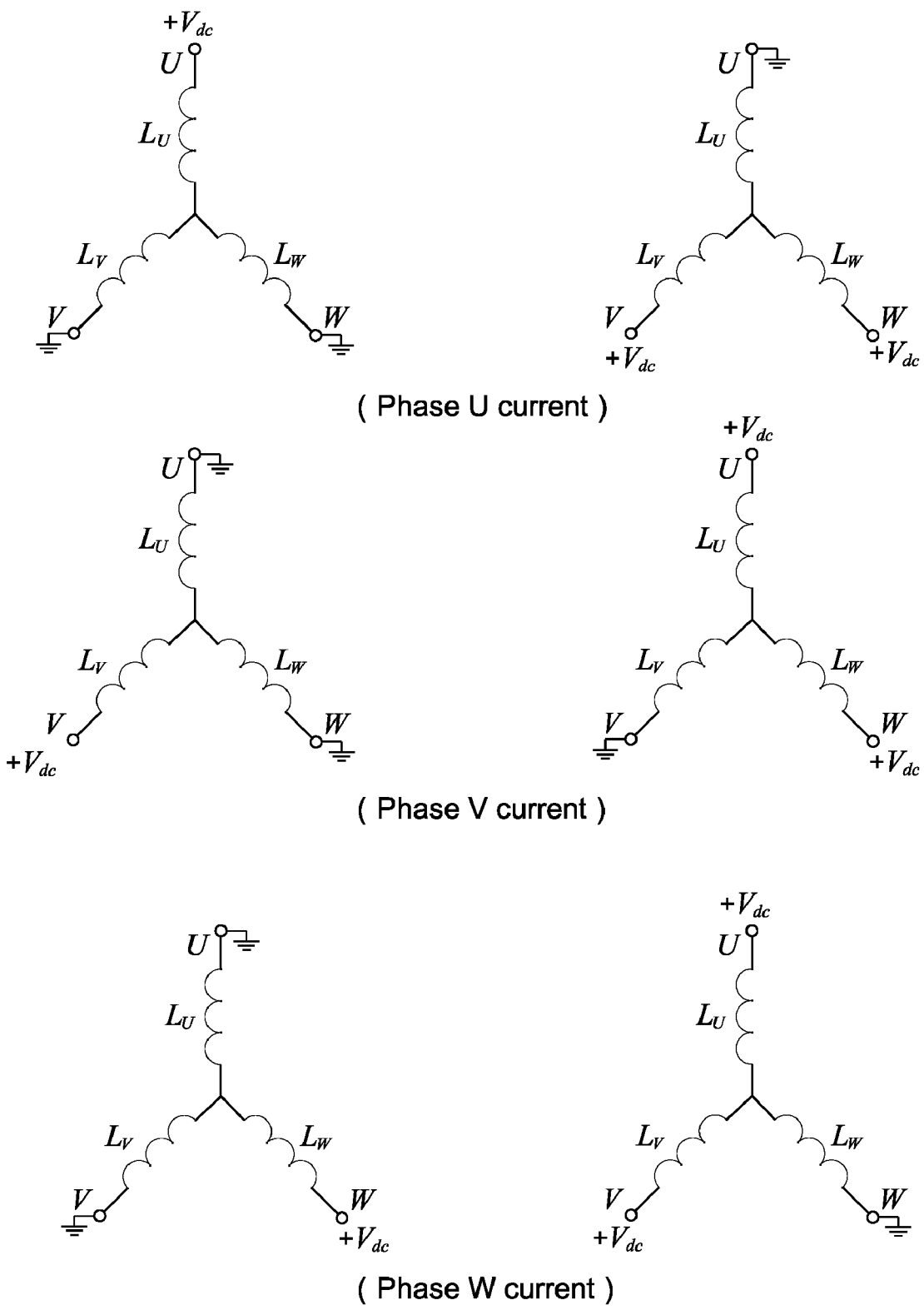
FIG. 4 shows the six bias ways for the three-phase windings before the permanent-magnet motor operates.

In other word, the stator inductances are different when the rotator is at different position. The initial magnetic pole position in permanent-magnet motor can be determined by measuring the rising time of current. FIG. 4 shows the six bias ways for the three-phase windings before the permanent-magnet motor operates. As shown in this figure, the three-phase windings U, V and W are applied with bias voltage Vdc to produce positive and negative pulses on the three-phase windings U, V and W, respectively. The rising for current produced by the applied bias voltage Vdc in the six ways are measured to obtain the initial magnetic pole position in the permanent-magnet motor.

Figure 5:
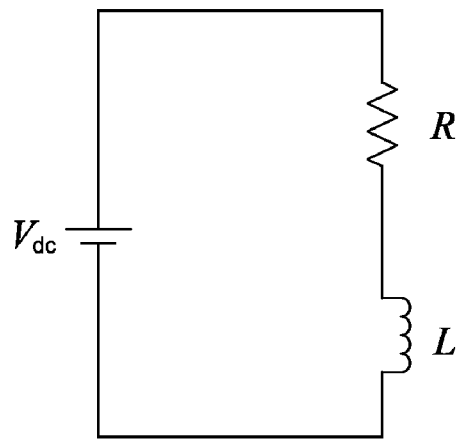
FIG. 5 shows the equivalent circuit for the permanent-magnet motor.
Figure 6:
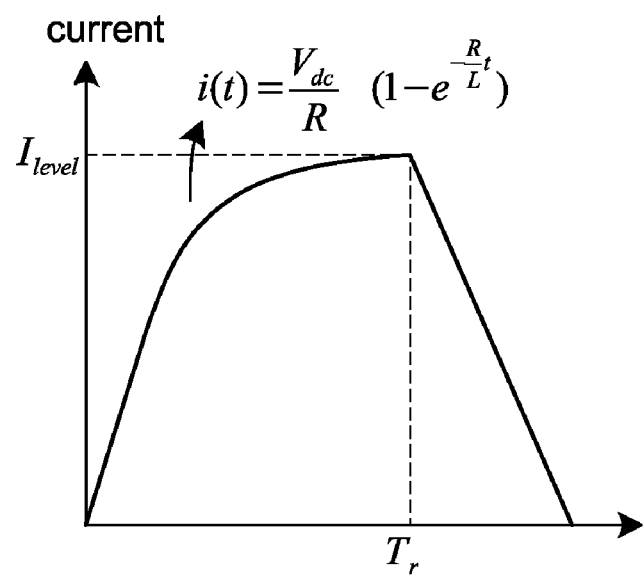
FIG. 6 shows the current waveform after excitation of motor coil.

FIG. 5 shows the equivalent circuit for the permanent-magnet motor. FIG. 6 shows the current waveform after excitation of motor coil, where R is motor coil resistance, L is inductance, $V_{dc}$ is bus voltage, $I_{rated}$ is motor rated current and $I_{level}=I_{rated} \times 160\%$. Let $i(t)=I_{level}$, the rising time $t_r$ can be calculated.

$$t_r = -\frac{L}{R} \times \ln\left|1 - \frac{I_{level} \times R}{V_{dc}}\right|$$

As can be seen from FIG. 6, the current has rapid rising, namely smaller rising time, when the inductance is smaller. Therefore, pulse signal is applied to six bias ways as shown in FIG. 6, and the rising time for current is measured. The rotation position with the shortest rising time is aligned with the stator. As to the setting of current level $I_{level}$, the rising time is difficult to dissolve when the rising current level is not enough. The current level $I_{level}$ can be set as 160% motor rated current. When the motor rated current is larger than the inverter rated current, the current level $I_{level}$ can be set as 160% inverter rated current.

To simplify calculation, the voltage drop across the resistor R is reduced and we have:

$$t_r = L \times \frac{I_{level}}{V_{dc}}$$

Figure 7:
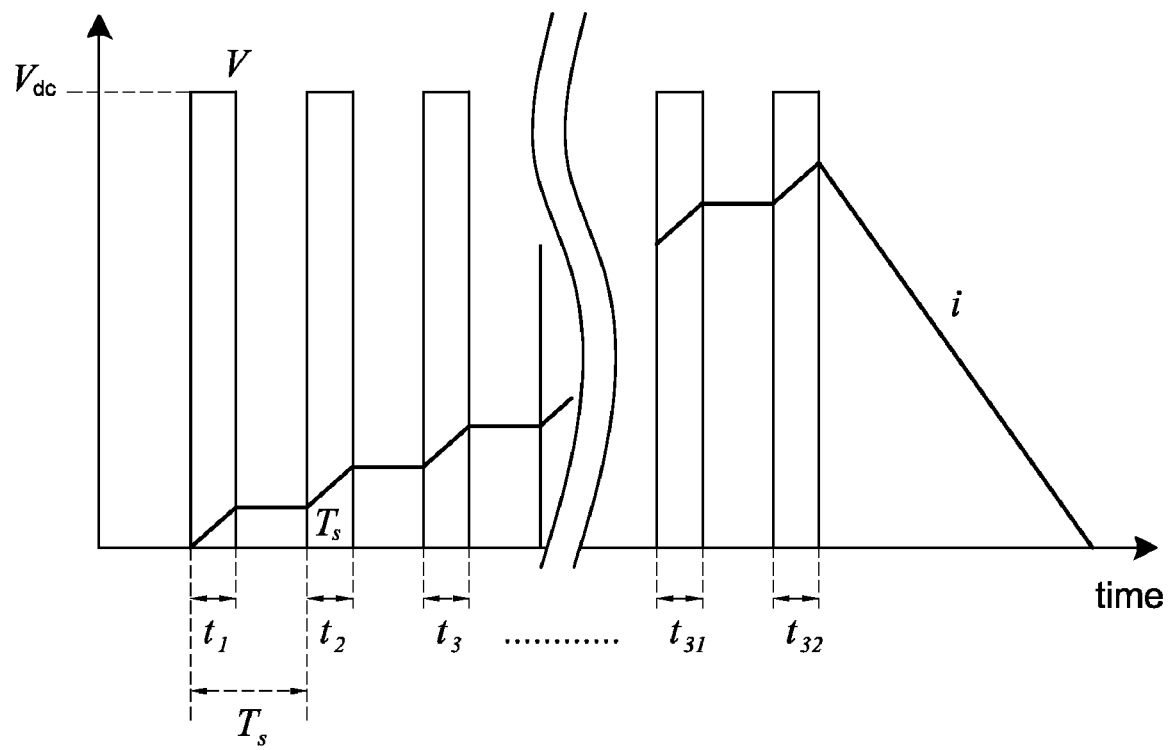
FIG. 7 shows the waveform in PWM scheme.
Figure 8:
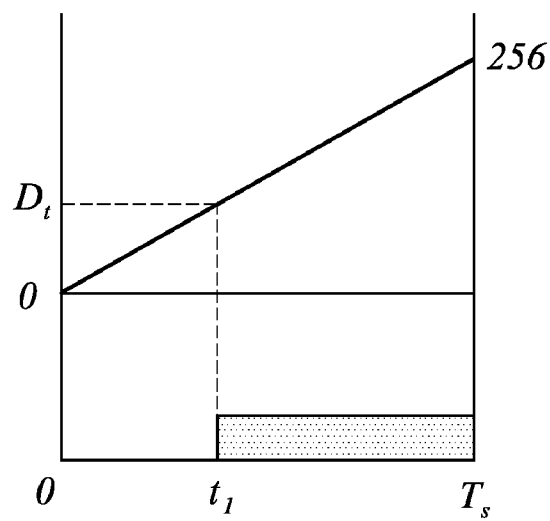
FIG. 8 shows the relationship between PWM interrupt time Ts and the PWM pulse width $D_t$.

The current ramp is difficult to be measured by computer program when the current rises too fast. Therefore, the voltage is preferably injected by pulse width modulation (PWM) instead of on-off manner. FIG. 7 shows the waveform in PWM scheme. The different motors have different motor parameters and the rising time is also different. The PWM scheme should be changed with motor parameter. FIG. 8 shows the relationship between PWM interrupt time Ts and the PWM pulse width $D_t$. The PWM interrupt time Ts is divided into 256 equal parts and the rising time tr is divided into 32 PWM interrupts (with also reference to FIG. 7), where $t_r=t_1+t_2+ \ldots +t_{31}+t_{32}$ and the PWM pulse width Dt can be calculated as:

$$Dt = (t_r + 32 \times DB) \times CF \times \frac{256}{32}$$

In above formula, DB is the dead time for preventing the short circuit between upper and lower arms (such as 4 μS) and CF is the maximal carry frequency of an inverter for driving the motor.

Figure 9:
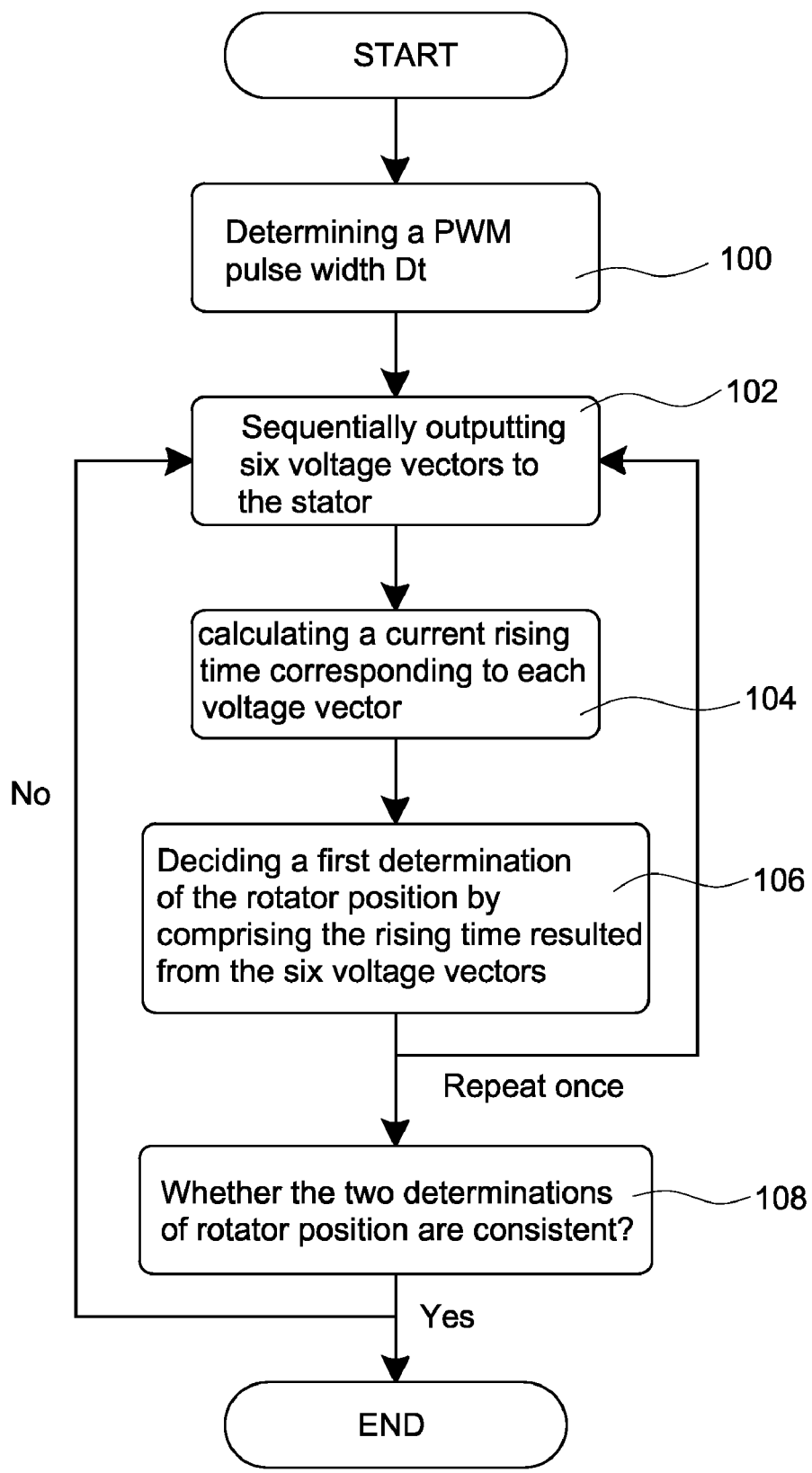
FIG. 9 shows the flowchart of method for detecting initial magnetic pole position in permanent-magnet motor.

FIG. 9 shows the flowchart of method for detecting initial magnetic pole position in permanent-magnet motor. The PWM pulse width Dt is first determined according to motor parameter and the maximal carry frequency of an inverter (step 100). Six voltage vectors with configuration shown in FIG. 4 are sequentially applied to the stator (step 102). The current rising time for each voltage vector is calculated (step 104). The calculated current rising time for each voltage vector is compared to obtain a determination for the rotator position (step 106). The steps 102 to 106 are performed again to find another determination for the rotator position. The two determinations are compared to check whether they are consistent (step 108). The detection of initial magnetic pole position in permanent-magnet motor is finished when the two determinations are consistent. In above steps, the steps 102 to 106 are repeated to minimize the influence of noise. When the two determinations are not consistent, the six voltage vectors are sequentially applied to the stator again and the rotator position is determined again. The flow is finished and the initial magnetic pole position in permanent-magnet motor can be sure when two successive determinations are consistent.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for detecting initial magnetic pole position in a permanent-magnet motor, the permanent-magnet motor being driven by an inverter and comprising rotators and stators, the stator comprising three-phase windings, the method comprising:
    (a) determining a PWM pulse width "Dt" to be applied to the stators;
    (b) sequentially outputting six voltage vectors to the stator;
    (c) calculating a current rising time corresponding to each voltage vector;
    (d) deciding a determination of the rotator position by comprising the rising time resulted from the six voltage vectors.

2. The method as in claim 1, further comprising:
    repeating the steps (b) to (d); and
    examining whether the two determinations of rotator position are consistent.

3. The method as in claim 1, wherein one PWM interrupt time "Ts" is divided into 256 equal parts.

4. The method as in claim 3, wherein one rising time "tr" is divided into 32 interrupts.

5. The method as in claim 4, wherein the PWM pulse width "Dt" is calculated by following equation:

$$Dt = (t_r + 32 \times DB) \times CF \times \frac{256}{32}$$

where "DB" is a dead time for preventing a short circuit between upper and lower arms and "CF" is a maximal carry frequency of the inverter for driving the motor.

6. The method as in claim 1, wherein a current level $I_{level}$ is set as 160% motor rated current.

7. The method as in claim 6, wherein the current level $I_{level}$ is set as 160% inverter rated current when the motor rated current is larger than the inverter rated current.

8. The method as in claim 1, wherein a current level $I_{level}$ is set as 160% motor rated current.

9. The method as in claim 6, wherein the current level $I_{level}$ is set as 160% inverter rated current when the motor rated current is larger than the inverter rated current.

10. A method for detecting initial magnetic pole position in permanent-magnet motor, the permanent-magnet motor being driven by an inverter and comprising rotators and stators, the stator comprising three-phase windings, the method comprising:
    (a) determining a PWM pulse width "Dt" to be applied to the stators;
    (b) sequentially outputting six voltage vectors to the stator;
    (c) calculating a current rising time corresponding to each voltage vector;
    (d) deciding a first determination of the rotator position by comprising the rising time resulted from the six voltage vectors;
    (e) repeating the steps (b) to (d) to get a second determination of the rotator position, and examining whether the two determinations of rotator position are consistent;
    (f) knowing the correct rotator position when the two determinations of rotator position are consistent; and
    (g) repeating steps (b) to (e) when the two determinations of rotator position are not consistent.

11. The method as in claim 10, wherein one PWM interrupt time "Ts" is divided into 256 equal parts.

12. The method as in claim 11, wherein one rising time "tr" is divided into 32 interrupts.

13. The method as in claim 12, wherein the PWM pulse width "Dt" is calculated by following equation:

$$Dt = (t_r + 32 \times DB) \times CF \times \frac{256}{32}$$

where "DB" is a dead time for preventing a short circuit between upper and lower arms and CF is a maximal carry frequency of the inverter for driving the motor.

* * * * *